Figure 1:
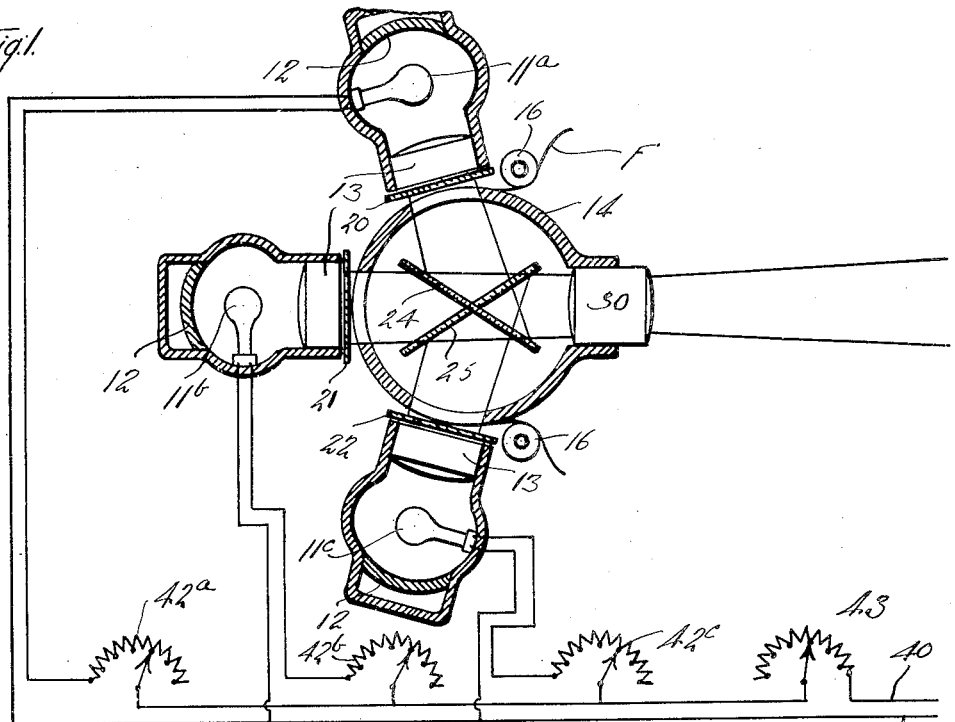

March 6, 1934. W. L. WRIGHT 1,949,892
APPARATUS FOR PROJECTING MOTION PICTURES
Original Filed Nov. 5, 1928    2 Sheets-Sheet 1

Inventor
Walter L. Wright
by his Attorney

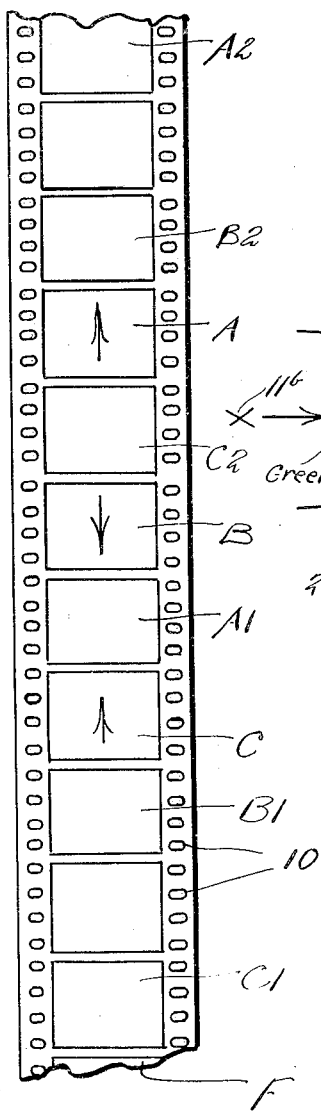
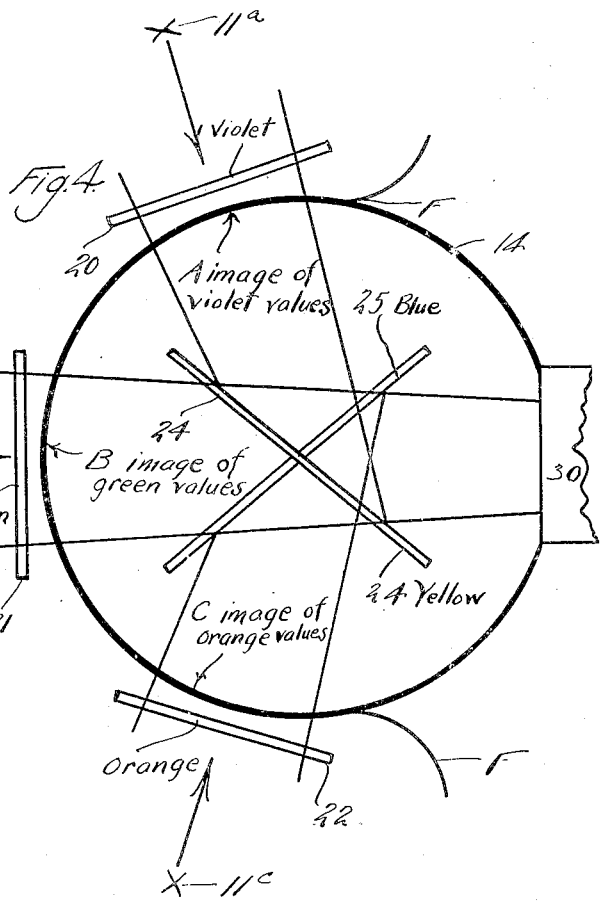

Patented Mar. 6, 1934

1,949,892

UNITED STATES PATENT OFFICE 1,949,892

APPARATUS FOR PROJECTING MOTION PICTURES

Walter L. Wright, Santa Monica, Calif., assignor to Synchrome Corporation, Los Angeles County, Calif., a corporation of California Application November 5, 1928, Serial No. 317,387
Renewed August 3, 1933

9 Claims. (Cl. 88—16.4)

This invention has to do with an apparatus for the projection of color motion pictures and it is a general object of the invention to facilitate the commercial practical production of color motion pictures, that is motion pictures in natural color.

The present invention is particularly suited for handling a single strip of motion picture film carrying successive series of pictures of a subject, the series having been taken in rapid succession and each series including several spaced images or pictures of different color sensations or values of a subject taken simultaneously and from a single angle or point of vision. Further, the specific film that will be referred to provides the several pictures of each series in spaced relation longitudinally of the film and provides three pictures in each series the center picture of the series being reversed, that is upside down, with reference to the end pictures. Further, in the specific film hereinafter mentioned the spaces between adjoining pictures of each series are occupied by pictures of other series, so that all of the available picture area of the film is utilized. The general type of film that I have referred to is the subject of United States Letters Patent No. 1,217,391, issued to Colin N. Bennett, February 27, 1917, entitled Color cinematography, and the specific form of film that I refer to is the subject of my co-pending application entitled Motion picture film, filed November 5, 1928, Serial No. 317,386.

It is a general object of the present invention to provide a simple, effective and commercially practical apparatus for the projection of a film such as I have referred to.

Another object of the invention is to provide an apparatus for the projection of separate shafts of light through the spaced pictures of a series and the uniting of such shafts, after they have passed the pictures, into a single or composite shaft carrying the values of the several separate shafts.

A further object of the invention is to provide an apparatus such as I have just referred to wherein the several separate shafts are united into a single composite shaft which is handled by a single projection lens to be thrown onto a screen, or the like.

It is another object of the present invention to provide for the control of the color values in the projection of color motion pictures whereby any desired balance or relationing of colors can be obtained. Through the present invention the several color values entering into the projected picture can be individually varied or adjusted making it possible to obtain a color balance which results in pictures in true natural color. This feature of the invention is obviously a marked improvement over the methods of color motion picture photography which require developing or toning of film or light filtration in such balanced proportions as to obtain suitable balance of color in the projected pictures.

It is another object of this invention to provide an improved light-handling arrangement for the projection of color motion pictures. The present invention provides for efficient, simple handling of several separate shafts of light to form a single composite shaft of light for projection onto a screen, or the like.

A further object of the invention is to provide a light-handling arrangement in a projector, which light handling arrangement embodies transparent reflectors and chromatic values in the reflectors whereby secondary reflections are eliminated.

A still further object of the present invention is to provide a motion picture projector wherein there are several separate sources of light and in which the shafts of light from such sources are united for projection as a single shaft of light. This feature of the invention makes it possible to obtain full illumination, and, further, makes it possible to use incandescent lamps of high candle power in situations which ordinarily require illumination by a carbon arc.

Figure 2:
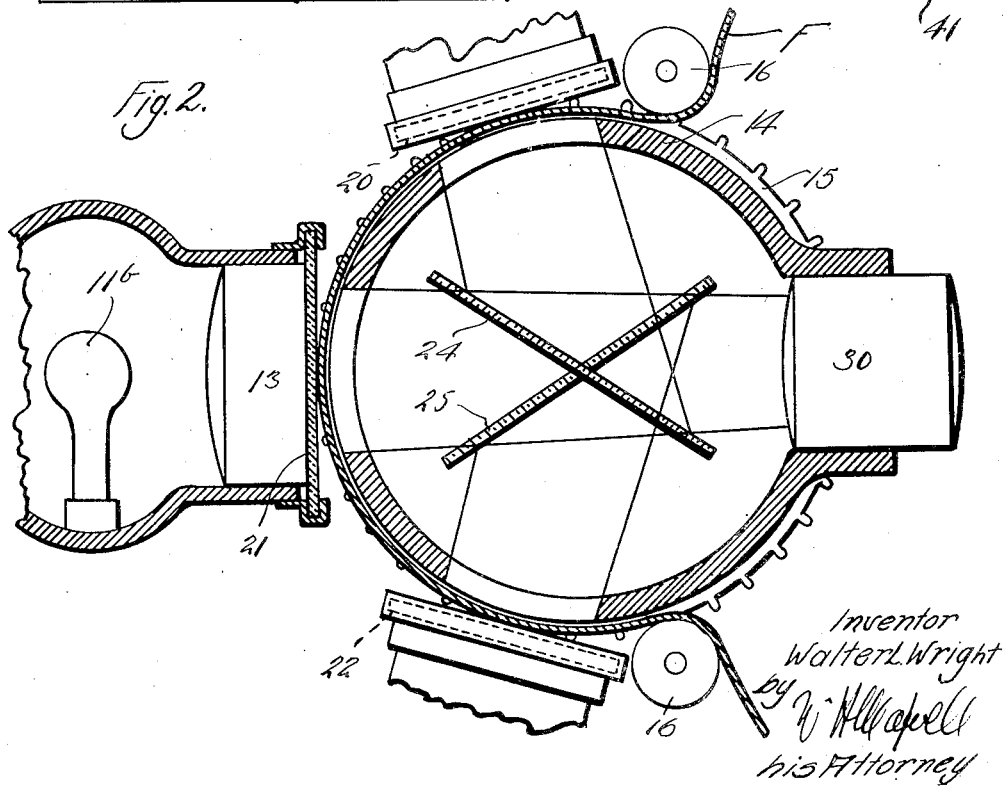

The various objects and features of the invention will be best and more fully understood from the following detailed description of a typical form and application of the invention, throughout which description I refer to the accompanying drawings, in which:

Fig. 1 is a diagrammatic view illustrating the general features of the invention. Fig. 2 is an enlarged detailed sectional view illustrating various detailed features of the invention. Fig. 3 is a view illustrating a length of film such as may be handled by the present invention, and Fig. 4 is a diagrammatic view bearing legends which will facilitate an understanding of the color system of the invention.

The apparatus of this invention provides, generally, for the projection of a plurality of separate shafts of light toward a common center, the arranging of a strip of film (of the type above mentioned) about the said center with the several pictures of a series in the path of the said separate shafts of light, the uniting of the several shafts of light, after they have passed the film, into a single or composite shaft for projection onto a screen, and chromatically influencing the several shafts of light so that they are chromatically different and correspond to the chromatic values recorded by the pictures through which they are respectively projected. Further, the invention provides, generally, control means for the light, preferably embodying means whereby the several lights, or sources of light, may be controlled proportionally, and means whereby the several sources of light may be individually controlled or regulated.

Before proceeding with a detailed description of the invention, I will describe the film F preferred to be used. This film is illustrated in Fig. 3 of the drawings wherein it is shown as formed of the usual or standard film stock having rows of perforations 10 adjacent its side edges. The several series of pictures are disposed longitudinally of the film F and adjacent pictures of each series are spaced apart and the spaces thus formed are occupied by pictures of adjoining series. In the drawings the letters A, B and C designate the three or several pictures of a series; the letters A1, B1 and C1 represent pictures of an adjoining series, the picture A1 being shown occupying the space on the film between the pictures B and C of the first series, and the letters A2, B2 and C2 designate pictures of another adjoining series, the picture C2 occupying the space between the pictures A and B of the first series. The several pictures of each series, for instance, the several pictures A, B and C, are to be considered as of different chromatic values of a single subject and as taken simultaneously from a single or common point of vision. For purpose of example, the picture A may be considered as of the violet values of the subject, the picture B as of the green values of the subject, and the picture C as of the orange values of the subject.

The several separate shafts of light are projected inwardly toward the common center in a manner to project through the pictures of the film in their path toward such center. The shafts of light may be generated in various ways or through or by various arrangements of apparatus. In accordance with the preferred form of the invention, I provide three separate sources of light 11a, 11b and 11c. Further, in accordance with the preferred form of the invention these sources of light are electric lights of the incandescent type. By having three separate sources of light I may use incandescent lamps and obtain the necessary illumination. In the arrangement illustrated the light generated by each source or lamp is handled by a reflector 12 and condensing lens 13 so that a concentrated or intense shaft of light is projected toward the common center toward which the several shafts are projected. The construction just mentioned is more or less diagrammatically set forth in the drawings, it being understood that any suitable light-handling or projecting arrangement may be used in this connection.

The film F is arranged about the above-mentioned common center so that the several pictures of a series such as pictures A, B and C are in the paths of the above-mentioned separate shafts of light. Various mechanical arrangements may be provided for the support of the film and for the intermittent advancement of the film to bring successive series of pictures into register with the shafts of light. In the drawings I have illustrated a film guide 14 and film-advancing sprocket 15 of the type and construction set forth and claimed in my co-pending application entitled Construction for cameras, projectors, etc., filed September 25, 1928, Serial No. 308,241. The film guide 14 is curved about the above-mentioned common center to support the film F curved about such center, while the sprocket 15 engages the film to hold and advance it with reference to the guide. It is to be understood that the sprocket is intermittently operated through a suitable movement mechanism to obtain the desired advance of the film with reference to the guide. Further, it is to be understood that suitable guide rollers 16 or other means may be provided for handling the film in its passage to and from the guide 14.

In accordance with the invention the several shafts of light projected through the several pictures of the film and toward the common center are chromatically influenced so that they correspond to the chromatic values or sensations recorded by the pictures. For example, in the present instance, where the picture A is being considered as of the violet values of the subject, the shaft of light projected through the picture A is chromatically influenced so that it is violet or predominantly violet, while the shaft of light projected through the picture B is chromatically influenced so that it is green, and the shaft of light projected through the picture C is chromatically influenced to be orange. The desired color values may be obtained in the said shafts of light in various manners, for example various or suitable colored lights may be generated at the sources, or lamps, 11a, 11b and 11c; the pictures A, B and C of the film may be tinted, or colored, or suitable color filters may be arranged in the shafts of light. In the drawings I have illustrated the last mentioned form of means as it is a practical, effective means and facilitates an understanding of the invention. I have shown a violet filter 20 in the path of light projected through the picture A of the film, a green filter 21 in the path of light projected through the picture B, and an orange filter 22 arranged in the path of light projected through the picture C. In the particular case illustrated the filters are shown located between the sources of light, or lamps, and the film, it being obvious that they may be arranged in other locations without departing from the spirit of the invention.

In accordance with the preferred form of the invention, the several shafts of light projected through the pictures of the film and toward the common center are handled through a chromatic optical system, or means, so that they are united into a single or common shaft of light for projection onto a screen, or the like. The preferred means for thus handling the shafts of light includes crossed transparent reflectors 24 and 25 colored so that only light reflected by their front surfaces enters into the composite shaft which is projected onto the screen. The reflectors are flat plates, for instance flat plates of colored glass, arranged within the curved guide 14 with their point of intersection substantially coincident with the common center toward which the several shafts of light are projected. The reflector 24 is arranged to reflect the shaft of light projected through the picture A so that it enters or becomes a part of the composite shaft, while the reflector 25 is arranged to reflect the shaft of light projected through the picture C so that it enters and becomes a part of the composite shaft. The shaft of light projected through the picture B is directed through both of the reflectors 24 and 25 and is initially projected in a direction to enter into or become a part of the composite projected shaft. The chromatic values incorporated in the reflectors 24 and 25 are such as to eliminate secondary reflections or back surface reflections from the reflectors 24 and 25 which would otherwise seriously interfere with the results of the system. In the particular case illustrated the reflector 24 is colored yellow or in other words is complementary to the violet light, and therefore will not pass the violet light projected onto the reflector 24 through the picture A. The violet light is, however, reflected by the front surface of the reflector 24 without being reflected by the rear surface of the reflector. The reflector 24 is made complementary to the light to be reflected by it, that is it is colored blue to be complementary to the orange light projected through the picture C. The blue reflector 25 will not pass the orange light, so therefore there is no back surface reflection to interfere with the final results although the orange light is effectively reflected by the front face of reflector 25. The yellow and blue of the reflectors 24, being values or sensations, entering into green light allow free passage of the green light projected through picture B, that is, the green light projected through the picture B passes through both the reflectors without material change or modification.

The chromatic system above described will be best understood by reference to Fig. 4 of the drawings in which figure the various elements are marked with legends. It will be obvious to those skilled in the art how the principles of the invention may be carried out using color combinations other than that specifically set forth.

The several shafts of light handled by the crossed reflectors enter a single composite shaft which is handled by a projection lens 30 so that it is thrown onto a screen where the various color values introduced into the composite shaft through the system above described result in a complete image in natural color.

The present invention provides control means to facilitate control or balancing of the color values so that true natural colors are obtained in the projected image. In the preferred form this control means provides for individual regulation of the shafts of light which are projected toward the common center and which are finally united into the composite shaft which is projected onto the screen. In practice the desired regulation of the individual shafts of light may be obtained by regulating the intensity of such shafts, for instance by regulation of the electric current supplied to the lamps 11$^a$, 11$^b$, 11$^c$. In the drawings I have illustrated the several lamps 11$^a$, 11$^b$, 11$^c$ connected with a main circuit carried by lines 40 and 41. Control means or rheostats 42$^a$, 42$^b$ and 42$^c$ are connected in the leads to the lamps 11$^a$, 11$^b$, 11$^c$, respectively, so that the several lamps can be individually regulated. For example, if it is desired to increase or decrease the violet values entering into the projected picture the rheostat 42$^a$ may be operated to increase or decrease the intensity of the light generated by the lamp 11$^a$. In a like manner the rheostat 42$^b$ can be operated to control the green light, while the rheostat 42$^c$ can be operated to control the orange light. Further, in accordance with the invention a main control, for instance a main rheostat 43 may be connected in one of the main lines ahead of the individual connections with the lamps so that all of the lamps can be regulated or proportionately varied simultaneously.

From the foregoing description it is believed that the invention will be fully understood, it having been pointed out how several separate shafts of light are generated, projected through separate pictures on a film strip, chromatically influenced, and united into a composite shaft for projection onto a screen to form an image made up of the values of the several pictures of the film and chromatically balanced so that the image is in true natural colors.

Having described only a typical preferred form and application of my invention, I do not wish to limit myself to the specific details set forth, but wish to reserve to myself any changes or variations that may appear to those skilled in the art or fall within the scope of the following claims.

Having described my invention, I claim:

1. In a motion picture projector, a guide for holding a film about a center, means directing a plurality of separate shafts of light through spaced pictures of the film and toward said center, a projection lens, and means uniting the shafts passed by the film so that they are coaxial with the principal axis of the lens and pass through the lens to form a composite image.

2. In a motion picture projector, a guide for holding a film about a center, means directing a plurality of separate shafts of light through spaced pictures of the film and toward said center, means for individually controlling the intensity of the said shafts of light prior to their passage through the film, a projection lens, and means uniting the shafts passed by the film so that they are coaxial with the principal axis of the lens and pass through the lens to form a composite image.

3. In a motion picture projector, a guide for holding a film about a center, means directing a plurality of separate shafts of light through spaced pictures of the film and toward said center, a projection lens, and crossed transparent reflectors at said center to unite the shafts so that they are coaxial with the principal axis of the lens and pass through the lens to form a composite image.

4. In a motion picture projector, a guide for holding a film about a center, means directing a plurality of separate shafts of light through spaced pictures of the film and toward said center, means influencing the shafts of light so that they are chromatically different, a projection lens, and transparent reflectors crossed approximately at said center to unite the shafts passed by the film so that they are coaxial with the principal axis of the lens and pass through the lens to form a single composite image.

5. In a motion picture projector, a guide for holding a length of film about a center, means directing a plurality of separate shafts of light through spaced pictures of the film and toward said center, means influencing the shafts of light so that they are chromatically different, a projection lens, and transparent reflectors crossed at said center to unite the shafts passed by the film so that they are coaxial with the principal axis of the lens and pass through the lens to form a single composite image, the reflectors being arranged to pass one shaft of light and each being arranged to reflect a shaft of light.

6. In a motion picture projector, a guide for holding a length of motion picture film about a center, means directing a plurality of separate shafts of light through spaced pictures of the film and toward said center, means influencing the shafts of light so that they are chromatically different, a projection lens, and transparent reflectors crossed approximately at said center to unite the shafts passed by the film so that they are coaxial with the principal axis of the lens and are directed through the lens to form a single composite image, the reflectors being arranged to pass one shaft of light and each being arranged to reflect a shaft of light, each reflector being colored complementary to the light reflected by it.

7. In a motion picture projector, a film guide for holding a length of motion picture film curved about a center, a plurality of light sources, means for directing the light shafts from said sources through spaced pictures on the film and toward said center, means influencing the said shafts so that they are chromatically different, a projection lens, and crossed transparent reflectors arranged to unite the shafts after their passage through the film so that they are coaxial with the principal axis of the lens and are passed through the lens to form a single composite image, the reflectors being arranged to pass one shaft of light and each to reflect one shaft of light, each reflector being colored complementary to the light reflected by it.

8. In a motion picture projector, a film guide for holding a length of motion picture film curved about a center, a plurality of light sources, means for individually controlling the light sources, means for directing the light shafts from said sources through spaced pictures on the film and toward said center, means influencing the said shafts so that they are chromatically different, a projection lens, and crossed transparent reflectors arranged to unite the shafts after their passage through the film so that they are coaxial with the principal axis of the lens and are passed through the lens to form a single composite image, the reflectors being arranged to pass one shaft of light and each to reflect one shaft of light, each reflector being colored complementary to the light reflected by it.

9. In a motion picture projector, a film guide for holding a length of motion picture film curved about a center, a plurality of light sources, means for directing the light shafts from said sources through spaced pictures on the film and toward said center, means influencing the said shafts so that they are chromatically different, a projection lens, and crossed transparent reflectors crossed at said center and arranged to unite the shafts after their passage through the film so that they are coaxial with the principal axis of the lens and pass through the lens to form a single composite image, the reflectors being arranged to pass one shaft of light and each to reflect one shaft of light, each reflector being colored complementary to the light reflected by it.

WALTER L. WRIGHT.